United States Patent
Elango et al.

(10) Patent No.: US 11,301,218 B2
(45) Date of Patent: Apr. 12, 2022

(54) GRAPH-BASED VECTORIZATION FOR SOFTWARE CODE OPTIMIZATION REFERENCES

(71) Applicant: BANK OF AMERICA CORPORATION, Charlotte, NC (US)

(72) Inventors: Tamilselvi Elango, Chennai (IN); Madhusudhanan Krishnamoorthy, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 16/941,868

(22) Filed: Jul. 29, 2020

(65) Prior Publication Data

US 2022/0035602 A1 Feb. 3, 2022

(51) Int. Cl.
*G06F 9/44* (2018.01)
*G06F 9/445* (2018.01)
*G06F 9/455* (2018.01)
*G06F 8/30* (2018.01)
*G06F 8/75* (2018.01)

(52) U.S. Cl.
CPC . *G06F 8/30* (2013.01); *G06F 8/75* (2013.01)

(58) Field of Classification Search
CPC ..... G06F 8/30; G06F 8/75; G06F 8/40; G06F 8/41; G06F 8/74
See application file for complete search history.

(56) References Cited

U.S. PATENT DOCUMENTS

| | | | |
|---|---|---|---|
| 8,185,547 B1* | 5/2012 | Ordonez | G06F 17/16 707/781 |
| 8,533,699 B2 | 9/2013 | Moir et al. | |
| 8,572,566 B2 | 10/2013 | Gass et al. | |
| 8,578,348 B2 | 11/2013 | Fliess et al. | |
| 8,578,358 B2 | 11/2013 | Gonion | |
| 8,595,439 B1 | 11/2013 | Koh et al. | |
| 8,645,932 B2 | 2/2014 | Wright et al. | |
| 8,726,255 B2 | 5/2014 | Gounares et al. | |
| 8,739,150 B2 | 5/2014 | Gass et al. | |
| 8,806,463 B1 | 8/2014 | Li et al. | |

(Continued)

OTHER PUBLICATIONS

William Killian, Using Graph-Based Characterization for Predictive Modeling of Vectorizable Loop Nests, 2015, pp. 1-28. https://cs.millersville.edu/~wkillian/files/Using.Graph-Based.Characterization.for.Predictive.Modeling.of.Vectorizable.Loop.Nests.pdf (Year: 2015).*

(Continued)

*Primary Examiner* — Mongbao Nguyen

(57) ABSTRACT

A software code optimizer automatically detects inefficiencies in software code and corrects them. Generally, the software code optimizer converts software code into a graph representing the workflows and relationships in the software code. The graph is then converted into vectors that represent each workflow in the software code. The vectors are assembled into a matrix that represents the software code. The matrix may be stored in a cluster in a database as an example of optimized software code or be compared with other matrices stored as clusters in the database to determine whether the software code is optimized. The software code optimizer can change the software code to be more efficient if a matrix for an optimized version of the software code is found in the database.

20 Claims, 5 Drawing Sheets

(56) References Cited

U.S. PATENT DOCUMENTS

| | | |
|---|---|---|
| 8,856,726 B2 | 10/2014 | Conrad et al. |
| 8,869,103 B2 | 10/2014 | Conrad et al. |
| 8,898,494 B2 | 11/2014 | Schluessler et al. |
| 8,918,769 B2 | 12/2014 | Lin |
| 8,930,926 B2 | 1/2015 | Bastoul et al. |
| 9,003,384 B2 | 4/2015 | Pizlo |
| 9,009,681 B2 | 4/2015 | Schmidt |
| 9,015,684 B1 | 4/2015 | Koh et al. |
| 9,098,309 B2 | 8/2015 | Vick et al. |
| 9,134,978 B1 | 9/2015 | Roskind |
| 9,141,166 B2 | 9/2015 | Sistla et al. |
| 9,256,410 B2 | 2/2016 | Pizlo et al. |
| 9,489,229 B2 | 11/2016 | Gschwind |
| 9,600,625 B2 | 3/2017 | Asadi et al. |
| 9,652,425 B2 | 5/2017 | Chen et al. |
| 9,870,210 B2 | 1/2018 | Gschwind et al. |
| 9,940,287 B2 | 4/2018 | Das Sharma |
| 9,996,696 B2 | 6/2018 | Baji-Gal |
| 10,055,237 B2 | 8/2018 | Kissell |
| 10,169,013 B2 | 1/2019 | Chen et al. |
| 10,324,741 B2 | 6/2019 | Westrelin et al. |
| 10,387,324 B2 | 8/2019 | Caprioli et al. |
| 10,409,612 B2 | 9/2019 | Dixon et al. |
| 10,579,584 B2 | 3/2020 | Vorbach et al. |
| 10,656,940 B1* | 5/2020 | Hogan ............. G06F 8/73 |
| 2015/0138209 A1 | 5/2015 | Dorie |
| 2015/0356294 A1 | 12/2015 | Tan et al. |
| 2015/0370560 A1 | 12/2015 | Tan et al. |
| 2016/0070552 A1 | 3/2016 | State et al. |
| 2016/0306631 A1 | 10/2016 | Vorbach |
| 2017/0235579 A1 | 8/2017 | Knauth et al. |
| 2018/0046442 A1 | 2/2018 | Lucco et al. |
| 2018/0225167 A1 | 8/2018 | Jayaprakash Bharadwaj et al. |
| 2018/0260416 A1* | 9/2018 | Elkaim ............... G06N 3/04 |
| 2018/0341686 A1* | 11/2018 | Hu .............. G06F 16/24575 |
| 2019/0005141 A1* | 1/2019 | Ho ..................... G06N 3/08 |
| 2019/0042217 A1 | 2/2019 | Glossop et al. |
| 2019/0265955 A1* | 8/2019 | Wolf ................. G06N 3/084 |
| 2019/0317879 A1* | 10/2019 | McCormick ........ G06K 9/6232 |
| 2019/0370231 A1* | 12/2019 | Riggs ................ G06F 16/248 |
| 2019/0391791 A1* | 12/2019 | Bebee .................. G06F 8/4441 |
| 2020/0104426 A1* | 4/2020 | Wu .................... G06N 20/00 |
| 2020/0265098 A1* | 8/2020 | Tepper .............. G06K 9/6215 |
| 2020/0310768 A1* | 10/2020 | Zhang ................. G06F 8/43 |
| 2020/0348929 A1* | 11/2020 | Sousa ................. G06F 8/36 |
| 2020/0394028 A1* | 12/2020 | Byrne ............... G06F 9/45558 |
| 2021/0048991 A1* | 2/2021 | Tanner ............... G06F 8/4442 |
| 2021/0073285 A1* | 3/2021 | Hunter ............... G06F 8/35 |
| 2021/0232376 A1* | 7/2021 | Wang ................. G06F 8/427 |
| 2021/0256538 A1* | 8/2021 | Butvinik ............ G06N 20/00 |
| 2021/0264251 A1* | 8/2021 | Kalluri ................ G06N 3/08 |

OTHER PUBLICATIONS

Vasileios Porpodas, Super-Node SLP: Optimized Vectorization for Code Sequences Containing Operators and Their Inverse Elements, 2018, pp. 206-215. https://dl.acm.org/doi/pdf/10.5555/3314872.3314897 (Year: 2018).*

Elango, T. et al., "Graph-Based Vectorization for Software Code Optimizations," U.S. Appl. No. 16/941,832, filed Jul. 29, 2020, 30 pages.

* cited by examiner

GRAPH-BASED VECTORIZATION FOR SOFTWARE CODE OPTIMIZATION REFERENCES

TECHNICAL FIELD

This disclosure relates generally to optimizing computer software code.

BACKGROUND

Software developers develop software applications by writing software code.

SUMMARY OF THE DISCLOSURE

Software developers develop software applications by writing software code. The software code is written to perform certain desired functionality when executed. There may be several different ways to write software code that performs the same function or achieves the same result. In other words, two software developers can write two different pieces of software code that perform the same function or achieve the same result. However, one piece of software code may be more efficient (e.g., less memory consumption, less time of execution, etc.) than the other. In these situations, the less efficient piece of software code can be optimized by changing the software code to execute more efficiently. Optimizing software code, however, is not a precise science and often is done incorrectly or suboptimally. As a result, when the software code is executed, it consumes more resources than it needs and/or takes more time than it needs.

This disclosure contemplates a software code optimizer that automatically detects inefficiencies in software code and corrects them. Generally, the software code optimizer converts software code into a graph representing the workflows and relationships in the software code. The graph is then converted into vectors that represent each workflow in the software code. The vectors are assembled into a matrix that represents the software code. The matrix may be stored in a cluster in a database as an example of optimized software code or be compared with other matrices stored as clusters in the database to determine whether the software code is optimized. The software code optimizer can change the software code to be more efficient if a matrix for an optimized version of the software code is found in the database. Certain embodiments are described below.

According to an embodiment, an apparatus includes a memory and a hardware processor communicatively coupled to the memory. The hardware processor receives software code, converts the software code into a graph that represents a plurality of workflows through the software code, and converts the graph into a plurality of vectors. Each vector of the plurality of vectors includes a numerical representation of a workflow of the plurality of workflows. The hardware processor also assembles the vectors into a first matrix, retrieves, from a database, a second matrix and a third matrix, compares the first matrix with the second and third matrices, determines, based on comparing the first matrix with the second and third matrices, that the first matrix is closer to the second matrix than the third matrix, and in response to determining that the first matrix is closer to the second matrix than the third matrix, converts the second matrix into reference software code. The hardware processor further compares the reference software code to the received software code to determine a difference between the reference software code and the received software code and changes the received software code to resolve the difference between the reference software code and the received software code.

According to another embodiment, an apparatus includes a memory and a hardware processor communicatively coupled to the memory. The hardware processor receives software code, converts the software code into a graph that represents a plurality of workflows through the software code, and converts the graph into a plurality of vectors. Each vector of the plurality of vectors includes a numerical representation of a workflow of the plurality of workflows. The hardware processor also assembles the vectors into a first matrix, uses the first matrix to search a database storing a plurality of matrices, determines, based on searching the database, a first centroid and a second centroid, compares the first matrix to the first centroid and the second centroid, determines, based on comparing the first matrix to the first centroid and the second centroid, that the first matrix is closer to the first centroid than the second centroid, and in response to determining that the first matrix is closer to the first centroid than the second centroid, assigns the first matrix to the first centroid in the database.

Certain embodiments provide one or more technical advantages. For example, an embodiment improves the efficiency of a computer or software code by implementing changes to the software code that reduce the memory consumption or execution time of the software code. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Embodiments of the present disclosure and its advantages are best understood by referring to FIGS. 1 through 3B of the drawings, like numerals being used for like and corresponding parts of the various drawings.

Software developers develop software applications by writing software code. The software code is written to perform certain desired functionality when executed. There may be several different ways to write software code that performs the same function or achieves the same result. In other words, two software developers can write two different pieces of software code that perform the same function or achieve the same result. However, one piece of software code may be more efficient (e.g., less memory consumption, less time of execution, etc.) than the other. In these situations, the less efficient piece of software code can be optimized by changing the software code to execute more efficiently. Optimizing software code, however, is not a precise science and often is done incorrectly or suboptimally. As a result, when the software code is executed, it consumes more resources than it needs and/or takes more time than it needs.

This disclosure contemplates a software code optimizer that automatically detects inefficiencies in software code and corrects them. Generally, the software code optimizer converts software code into a graph representing the workflows and relationships in the software code. The graph is then converted into vectors that represent each workflow in the software code. The vectors are assembled into a matrix that represents the software code. The matrix may be stored in a cluster in a database as an example of optimized software code or be compared with other matrices stored as clusters in the database to determine whether the software code is optimized. The software code optimizer can change the software code to be more efficient if a matrix for an optimized version of the software code is found in the database.

A practical application of the software code optimizer is that the software code optimizer improves the functioning of a computer or software code by changing the software code to reduce the resource consumption and/or execution time of the software code, in certain embodiments. The system will be described in more detail using FIGS. 1 through 3B.

Figure 1:
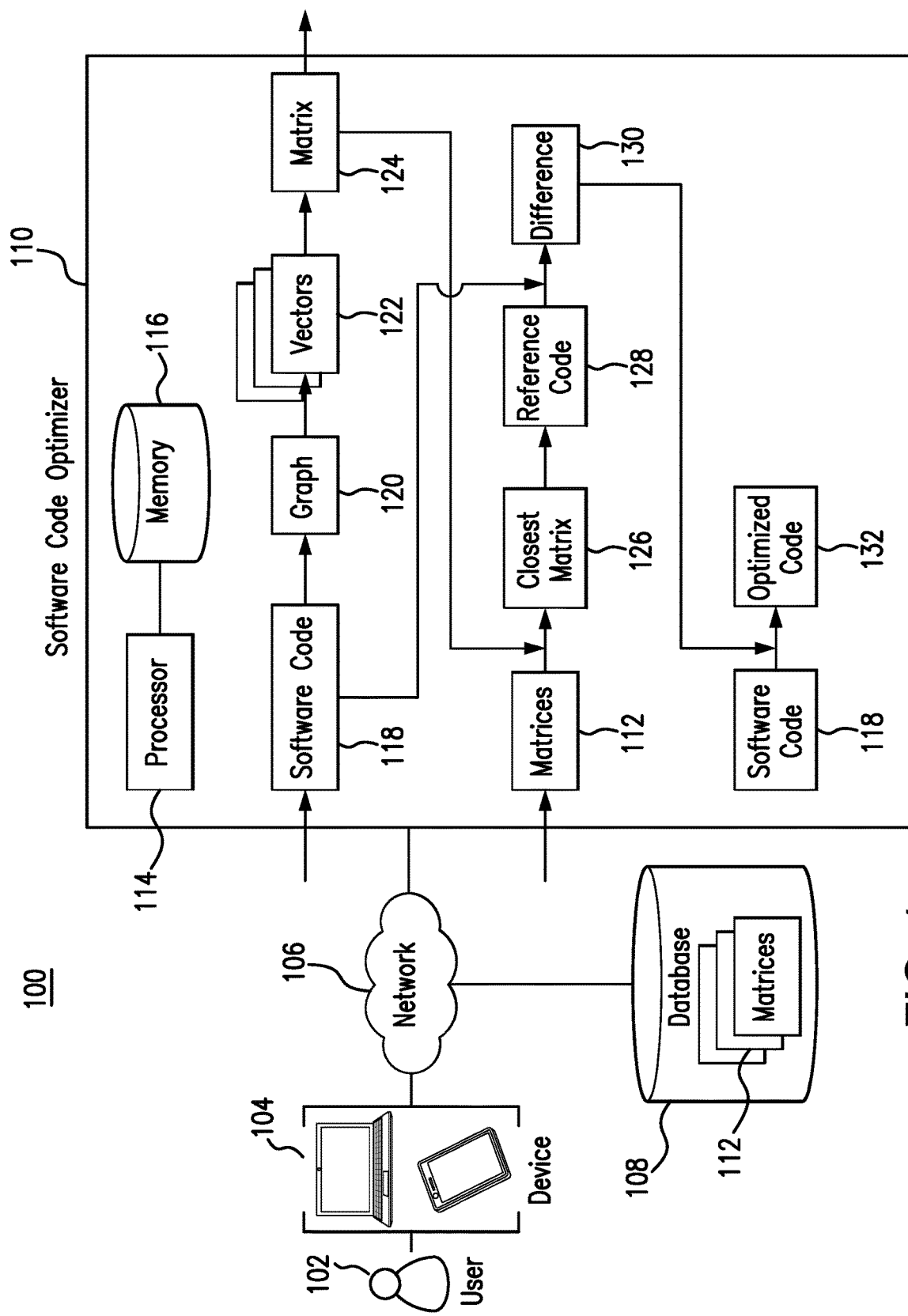
FIG. 1 illustrates an example system.

FIG. 1 illustrates an example system 100. As seen in FIG. 1, system 100 includes one or more devices 104, a network 106, a database 108, and a software code optimizer 110. Generally, system 100 automatically detects and corrects inefficiencies in software code. In particular embodiments, system 100 improves the functioning of a computer and/or software code by changing the software code to reduce the resource consumption and/or the execution time of the software code.

User 102 uses devices 104 to interact with other components of system 100. For example, user 102 may be a software developer that uses a device 104 to develop software code. As another example, user 102 may use device 104 to initiate a software code optimization using software code optimizer 110. Device 104 may receive communications from other components of system 100, such as software code optimizer 110. For example, device 104 may receive optimized software from software code optimizer 110.

Devices 104 include any appropriate device for communicating with components of system 100 over network 106. For example, devices 104 may be a telephone, a mobile phone, a computer, a laptop, a tablet, an automated assistant, and/or a cash register. This disclosure contemplates device 104 being any appropriate device for sending and receiving communications over network 106. As an example and not by way of limitation, device 104 may be a computer, a laptop, a wireless or cellular telephone, an electronic notebook, a personal digital assistant, a tablet, or any other device capable of receiving, processing, storing, and/or communicating information with other components of system 100. Device 104 may also include a user interface, such as a display, a microphone, keypad, or other appropriate terminal equipment usable by user 102. Device 104 may include a hardware processor, memory, and/or circuitry configured to perform any of the functions or actions of device 104 described herein. For example, a software application designed using software code may be stored in the memory and executed by the processor to perform the functions of device 104.

Network 106 allows communication between and amongst the various components of system 100. For example, user 102 may use devices 104 to communicate over network 106. This disclosure contemplates network 106 being any suitable network operable to facilitate communication between the components of system 100. Network 106 may include any interconnecting system capable of transmitting audio, video, signals, data, messages, or any combination of the preceding. Network 106 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Database 108 stores information used by other components of system 100. For example, database 108 may store matrices 112 that represent certain pieces of software code. This software code may be referenced as optimized versions of software code. The matrices 112 may be compared with matrices of other software code to determine which matrix of matrices 112 best represents the matrices of the other software code. The software code for matrices 112 may then be used as a reference to optimize the other software code.

Software code optimizer 110 automatically detects and corrects inefficiencies in software code. In particular embodiments, software code optimizer 110 improves the operation of a computer and/or software code by changing the software code to reduce its resource consumption and/or execution time. As seen in FIG. 1, software code optimizer 110 includes a processor 114 and a memory 116, which may be configured to perform any of the actions and functions of software code optimizer 110 described herein.

Processor 114 is any electronic circuitry, including, but not limited to microprocessors, application specific integrated circuits (ASIC), application specific instruction set processor (ASIP), and/or state machines, that communicatively couples to memory 116 and controls the operation of software code optimizer 110. Processor 114 may be 8-bit, 16-bit, 32-bit, 64-bit or of any other suitable architecture. Processor 114 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 114 may include other hardware that operates software to control and process information. Processor 114 executes software stored on memory to perform any of the functions described herein. Processor 114 controls the operation and administration of software code optimizer 110 by processing information received from devices 104, network 106, and memory 116. Processor 114 may be a programmable logic device, a microcontroller, a microprocessor, any suitable processing device, or any suitable combination of the preceding. Processor 114 is not limited to a single processing device and may encompass multiple processing devices.

Memory 116 may store, either permanently or temporarily, data, operational software, or other information for processor 114. Memory 116 may include any one or a combination of volatile or non-volatile local or remote devices suitable for storing information. For example, memory 116 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 116, a disk, a CD, or a flash drive. In particular embodiments, the software may include an application executable by processor 114 to perform one or more of the functions described herein.

Software code optimizer 110 receives software code 118. Software code 118 may be communicated by device 104. Software code optimizer 110 may use software code 118 in different ways. For example, software code optimizer 110 may analyze software code 118 to detect inefficiencies in software code 118. Software code optimizer 110 may then correct these inefficiencies in software code 118. As another example, software code optimizer 110 may use software code 118 to train software code optimizer 110 on what optimized software code looks like. Software code optimizer 110 may then store a matrix 112 representing software code 118 in database 108. Software code 118 may be written in any appropriate language. In this manner, software code optimizer 110 is configured to handle any software code 118 written in any programming language.

Software code optimizer 110 converts software code 118 into a graph 120. Graph 120 may include nodes and links that collectively represent the workflows and relationships within software code 118. For example, the nodes may represent various elements within software code 118, and the links may represent the relationships between these elements along with the workflow through these elements. As a result, graph 120 is a pictorial representation of software code 118.

Software code optimizer 110 converts graph 120 into vectors 122. Each vector 122 includes a numerical representation of a particular workflow in software code 118. For example, if graph 120 shows four distinct workflows in software code 118, then software code optimizer 110 may convert graph 120 into four vectors 122. Workflows that are very different from one another will have vectors 122 that are very different from one another. On the other hand, workflows that are very similar to one another will have vectors 122 that are very similar to one another.

Software code optimizer 110 assembles vectors 122 into a matrix 124. For example, software code optimizer 110 may treat each vector 122 as a column of matrix 124. As another example, software code optimizer 110 may treat each vector 122 as a row of matrix 124. As a result, matrix 124 becomes a numerical representation of software code of 118. Matrix 124 may represent the functionality, workflows, and/or elements within software code 118. Different pieces of software code that have similar functionality, workflows, and/or elements will have matrices 124 that are very similar to one another. On the other hand, different pieces of software code that have very different functionality, workflows, and/or elements will have matrices 124 that are very different from one another.

If software code optimizer 110 is using software code 118 to train software code optimizer 110 on what optimized software code looks like, then software code optimizer 110 may store matrix 124 in database 108. In particular embodiments, software code optimizer 110 may store matrix 124 in clusters in database 108. For example, software code optimizer 110 may analyze one or more centroids of one or more clusters in database 108 to determine the centroid that is closest to matrix 124. Software code optimizer 110 may then assign matrix 124 to that centroid to store matrix 124 into database 108 as part of a cluster belonging to that centroid. By storing matrix 124 in a cluster in database 108, it becomes more efficient to search database 108 for an appropriate matrix 124 for a piece of software code 118, in particular embodiments. If software code optimizer 110 is analyzing software code 118 to determine inefficiencies in software code 118, then software code optimizer 110 may analyze matrix 124 to determine a matrix 112 in database 108 that is closest to matrix 124. Software code optimizer 110 may use matrix 124 to search database 108. During the search, database 108 may return matrices 112 that are close or similar to matrix 124. In certain embodiments, software code optimizer 110 may use matrix 124 to search for a cluster of a matrices 112 in databased 108. Database 108 returns the matrices 112 that are assigned to a cluster closest to matrix 124. This cluster may be the cluster to which matrix 124 would have been assigned had software code optimizer 110 attempted to store matrix 124 in database 108.

Software code optimizer 110 compares matrix 124 with matrices 112 to determine a closest matrix 126 to matrix 124. In certain embodiments, software code optimizer 110 may determine a distance between matrix 124 and each matrix 112. The matrix 112 with the shortest distance to matrix 124 is considered closest matrix 126. As a result, closest matrix 126 may represent software code that is an optimized version of software code 118.

Software code optimizer 110 converts closest matrix 126 to reference code 128. Reference code 128 may represent the software code that generated closest matrix 126. Software code optimizer 110 may then compare reference code 128 to software code 118 to determine a difference 130. Difference 130 may represent a change that should be may to software code 118 to further optimize software code 118. In certain embodiments, software code optimizer 110 may determine a difference between reference code 128 and software code 118 by comparing the text of software code of 118 with the text of reference code 128 to determine differences in the text. Software code optimizer 110 may analyze the text and/or structure of reference code 128 and determine differences in the text and/or structure. These differences may represent ways to make software code 118 more efficient.

Software code optimizer 110 changes software code 118 to resolve difference 130 between software code 118 and reference code 128. By resolving the difference 130, software code 118 may be made more efficient. For example, resolving difference 130 may reduce the resource consumption associated with executing software code 118. As another example, resolving difference 130 may reduce the execution time of software code 118. By resolving difference 130 in software code 118, software code optimizer 110 generates optimized code 132. In particular embodiments, software code optimizer 110 may communicate optimized code 132 to device 104 so that user 102 can implement optimized code 132 rather than software code 118. In this manner, software code optimizer 110 reduces the resource consumption and/or execution time of software code 118 in particular embodiments. Software code optimizer 110 may communicate the optimized code 132 to device 104 to reduce the execution time of software code 118.

As an example, software code optimizer 110 may analyze a piece of software code 118 that analyzes each element of an array and performs a corresponding function based on the value of the element of the array. After analyzing this piece of software code 118, software code optimizer 110 may determine that a stream analysis would be more efficient than analyzing each element of the array. As a result, optimized code 132 may convert software code 118 to a stream analysis rather than an array analysis. As another example, software code optimizer 110 may analyze a piece of software code 118 that builds a string by appending particular elements to the string. After analyzing software code 118, software code optimizer 110 may determine that using a string builder class is more efficient than building the string element by element. As a result, optimized code 132 may implement the string builder class to build the string. As another example, software code optimizer 110 may analyze a piece of software code 118 that performs a logical comparison using a single bar OR. After analyzing software code 118, software code optimizer 110 may determine that optimized code 132 should use a double bar OR rather than a single bar OR to reduce the execution time of software code 118. Software code optimizer may then change software code 118 from a single bar OR to a double bar OR.

Figure 2A:
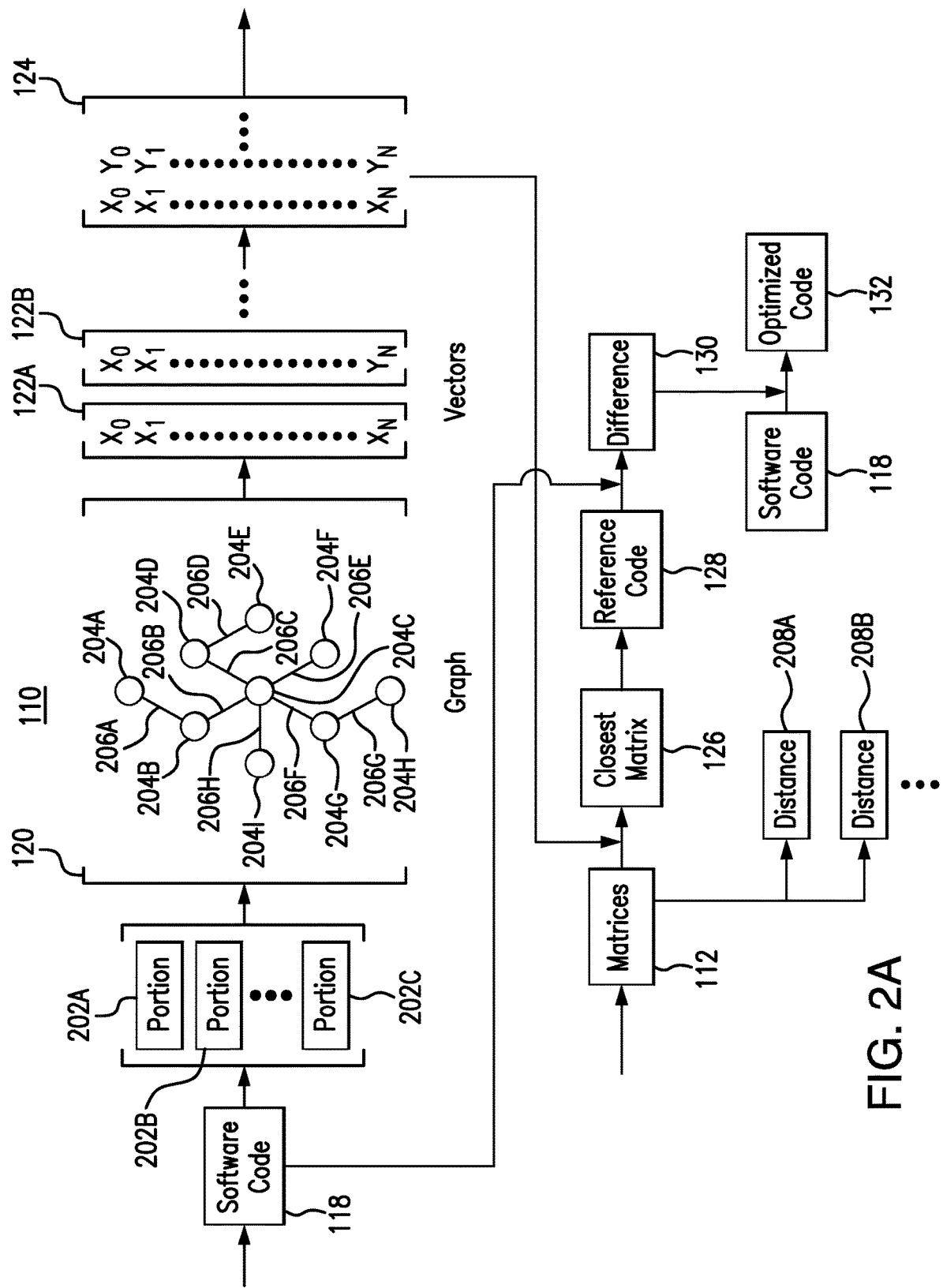
FIGS. 2A and 2B illustrates an example software code optimizer in the system of FIG. 1.
Figure 2B:
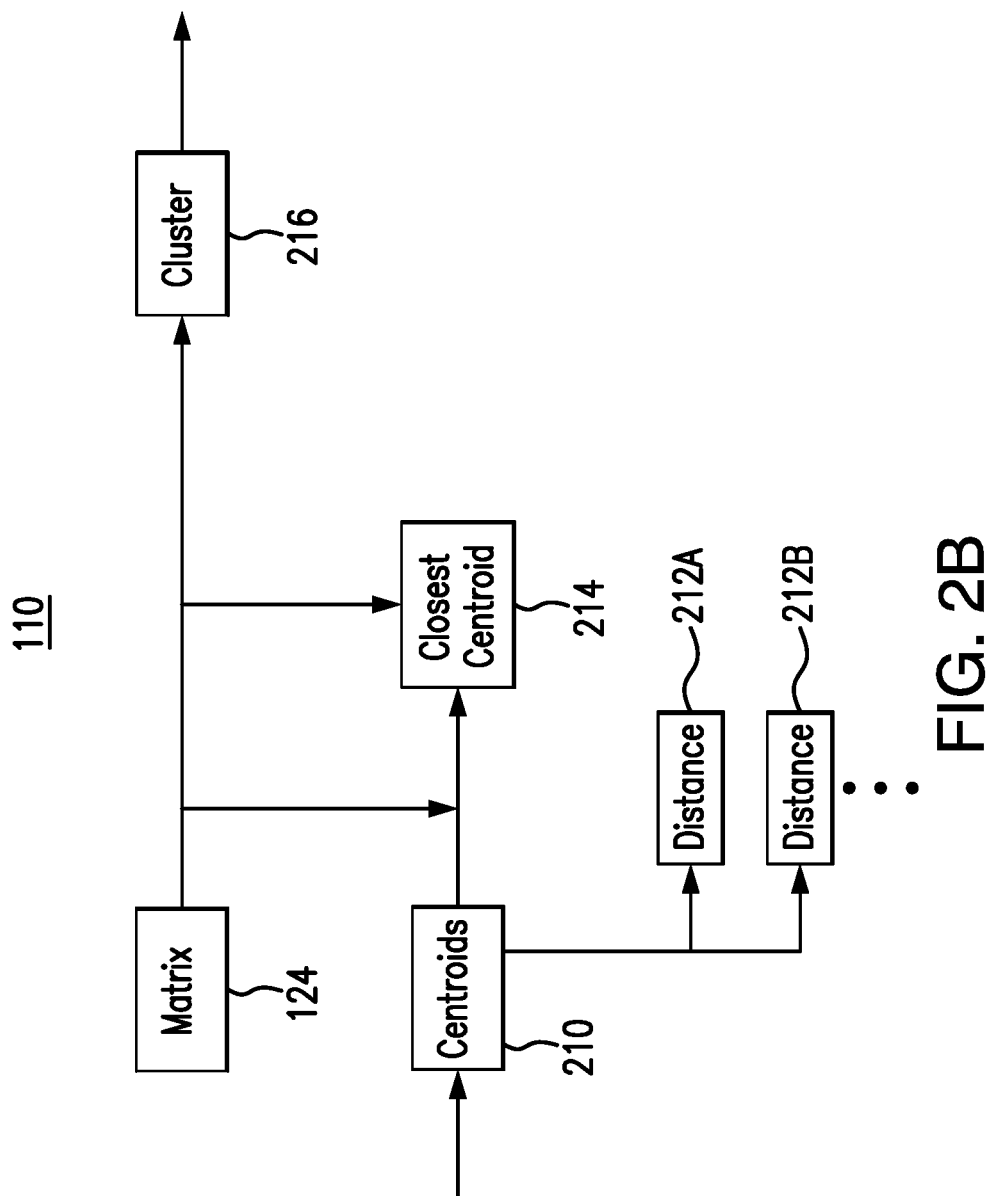

FIGS. 2A and 2B illustrate an example software code optimizer 110 in the system 100 of FIG. 1. Generally, software code optimizer 110 analyzes software code 118 to train the software code optimizer 110 to recognize software code optimizations or to detect and correct efficiencies in software code 118. In particular embodiments, software code optimizer 110 reduces the resource consumption and/or execution time of software code 118.

FIG. 2A illustrates an example software code optimizer 110 detecting and correcting inefficiencies in software code 118. Software code optimizer 110 receives software code 118. In certain embodiments, software code optimizer 110 receives software code 118 from device 104 along with instruction to optimize software code 118. In response to receiving software code 118, software code optimizer 110 may break software code 118 into one or more portions 202. Each portion 202 may represent a functional workflow through software code 118. In the example of FIG. 2A, software code optimizer 110 breaks software code 118 into portions 202A, 202B, and 202C. Software code optimizer 110 may break software code 118 into any appropriate number of portions 202.

Software code optimizer 110 then converts software code 118 and/or portions 202 into graph 120. Graph 120 may include one or more nodes 204 and one or more links 206 connecting the one or more nodes 204. Each node 204 may represent an element within software code 118. By arranging nodes 204 and connecting nodes 204 with links 206, software code optimizer 110 constructs a pictorial representation of software code 118. In the example of FIG. 2A, graph 120 includes nodes 204A, 204B, 204C, 204D, 204E, 204F, 204G, 204H, and 204I. Nodes 204A and 204B are connected by link 206A. Nodes 204B and 204C are connected by link 206B. Nodes 204C and 204D are connected by link 206C. Nodes 204D and 204E are connected by link 206D. Nodes 204C and 204F are connected by 206E. Nodes 204C and 204G are connected by link 206F. Nodes 204G and 204H are connected by link 206G. Nodes 204C and 204I are connected link 206H. Graph 120 may show the workflow through software code 118. Using the example of FIG. 2A, a workflow may be from node 204A to node 204B to node 204C to node 204F. As another example, a workflow in software code 118 maybe from node 204E to node 204D to node 204C to node 204I. This disclosure contemplates graph 120 including any suitable number of workflows through software code 118.

In particular embodiments, software code optimizer 110 may make changes to software code 118 before converting software code 118 into graph 120. For example, software optimizer code 110 may remove comments from software code 118 so that the comments do not influence graph 120. In this manner, software code optimizer 110 removes sections of software code 118 that do not influence the function of software code 118 before converting software code 118 into graph 120.

Software optimizer code 110 may produce any suitable number of vectors 122 based on graph 120, and specifically, based on the workflows in graph 120. Each vector 122 may represent a particular workflow shown in graph 120. Each vector 122 may include a numerical representation of a workflow in graph 120. In the example of FIG. 2A, software optimizer 110 generates vector 122A, a vector 122B, and so on based on graph 120. Vector 122A and vector 122B may include numerical representations of different workflows through software code 118.

Software code optimizer 110 assembles vectors 122 into a matrix 124. In the example of FIG. 2A, software code optimizer 110 assembles matrix 124 using vectors 122 by treating each vector 122 as a column of matrix 124. Software code optimizer 110 may assemble matrix 124 using vectors 122 in any suitable manner. For example, software code optimizer 110 may assemble matrix 124 by treating each vector 122 as a row of matrix 124.

Software code optimizer 110 may use matrix 124 to search database 108 for matrices 112 that most closely resemble matrix 124. In certain embodiments, software code optimizer 110 may locate a cluster of matrices 112 in database 108 that most closely approximate matrix 124. For example, software code optimizer 110 may search for a centroid of a cluster that most closely resembles matrix 124 and return the matrices 112 assigned to that centroid or cluster. Software code optimizer 110 receives matrices 112 from database 108 based on that search. Software code optimizer 110 then compares matrix 124 with each matrix 112 assigned to that centroid or cluster. In particular embodiments, software code optimizer 110 may determine a distance 208 between a matrix 112 and matrix 124. In the example of FIG. 2A, software code optimizer 110 determines a distance 208A, a distance 208B, and so on by comparing matrix 124 with each of the matrices 112. Software code optimizer 110 may then select the matrix 112 with the shortest distance 208 as the closest matrix 126. The closest matrix 126 may represent the software code that is the optimized version of software 118.

Software code optimizer 110 converts closest matrix 126 to reference code 128. Reference code 128 may be an optimized version of software code that performs the same functions or features as software code 118. Software code optimizer 110 may compare reference code 128 to software code 118 to determine a difference 130. Difference 130 may reflect an inefficiency in software code 118. Software code optimizer 110 may implement a change to software code 118 to resolve difference 130 to produce optimize code 132. In this manner, optimized code 132 may resolve the inefficiency within software code 118. Software code optimizer 110 may communicate optimized code 132 to device 104 so that user 102 may implement optimized code 132 rather than software code 118. In particular embodiments, by optimizing software code 118, user 102 reduces the resource consumption or execution times of software code 118.

FIG. 2B shows an example of software code optimizer 110 storing a matrix 124. Matrix 124 may be formed using the same process shown in the example of FIG. 2A. Generally, matrix 124 may be formed by converting software code 118 to graph 120, and then by converting graph 120 into vectors 122. Vectors 122 may then be assembled to form matrix 124. Software code optimizer 110 may store matrix 124 to train software code optimizer 110. Software code optimizer 110 may store matrix 124 as part of a cluster in database 108. Software code optimizer 110 may use matrix 124 to search database 108 for centroids 210. Database 108 may communicate centroids 210 to software code optimizer 110 so software code optimizer 110 may determine the most suitable centroid 210 for matrix 124. Software code optimizer 110 may calculate distances 212 between each centroid 210 and matrix 124. In the example in FIG. 2B, software code optimizer 110 calculates distance 212A, distance 212B, and so on between matrix 124 and each of the centroids 210. Software code optimizer 110 may then select the centroid 210 with the shortest distance 212 between that centroid 210 and matrix 124 as the closest centroid 214. Software code optimizer 110 may then assign matrix 124 to closest centroid 214, effectively assigning matrix 124 to a cluster 216 represented by closest centroid 214. Software code optimizer 110 may then store matrix 124 in database 108 as part of cluster 216. In this manner, matrix 124 will be returned to software code optimizer 110 when software code optimizer 110 searches database 108 and cluster 216 is returned.

Figure 3A:
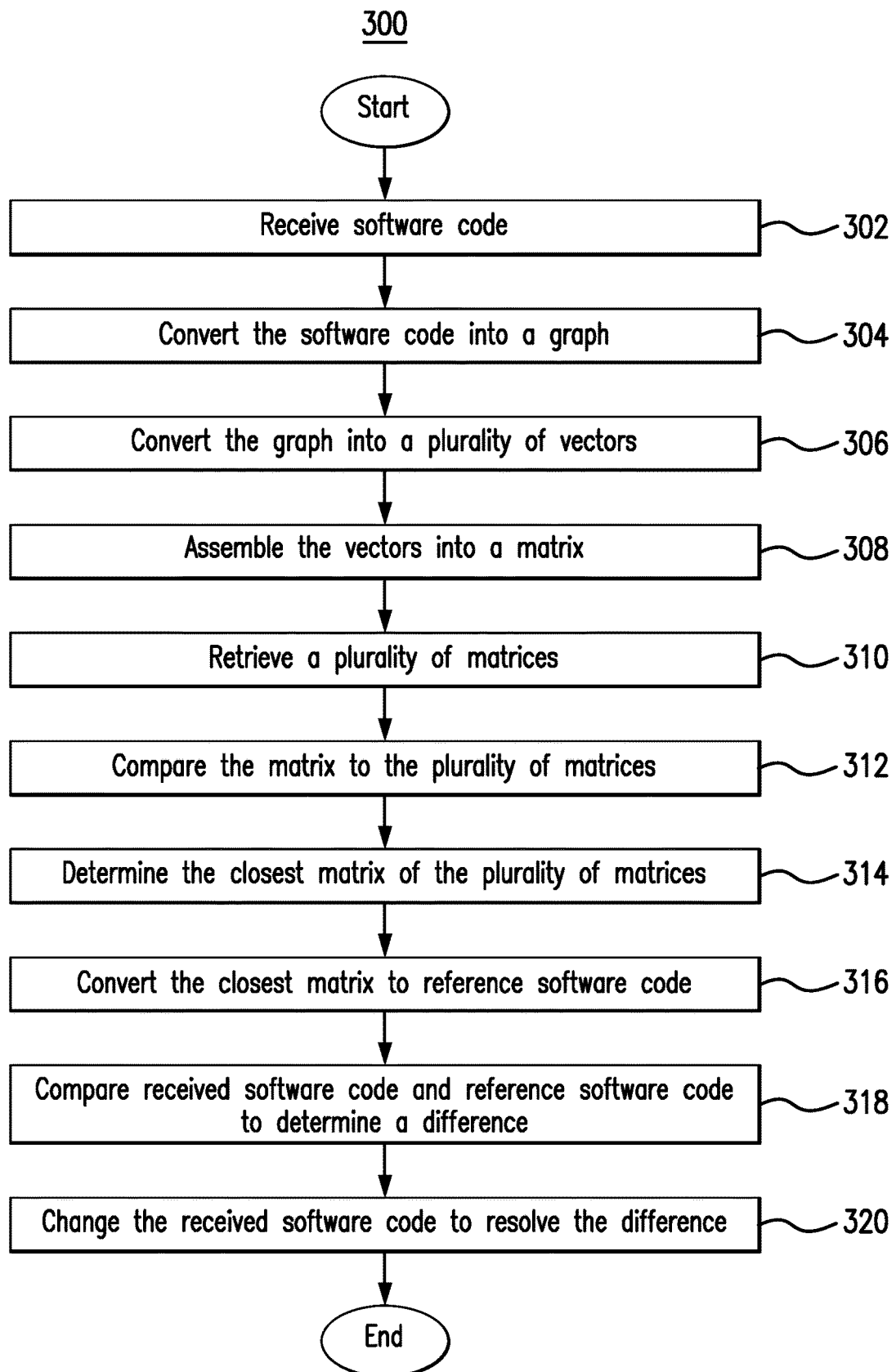
FIGS. 3A and 3B are flowcharts illustrating methods of optimizing software code using the system of FIG. 1.

FIG. 3A is a flow chart illustrating a method 300 of optimizing software code 118 using the system 100 of FIG. 1. Generally, software code optimizer 110 performs the steps of method 300. In particular embodiments, by performing method 300, software code optimizer 110 reduces the resource consumption and/or the execution time of software code 118.

Software code optimizer 110 receives software code 118 from step 302. Software code optimizer 110 may receive software code 118 from device 104. In step 304, software code optimizer 110 converts the software code 118 into a graph 120. In certain embodiments, software code optimizer 110 may break software code 118 into one or more portions 202 before converting software code 118 into a graph 120. Graph 120 may include nodes 204 and links 206 that form a pictorial representation of the elements, relationships, and/or workflows in software code 118.

In step 306, software code optimizer 110 converts the graph 120 into a plurality of vectors 122. Each vector 122 may include a numerical representation of a workflow in software code 118. In step 308, software code optimizer 110 assembles the vectors 122 into a matrix 124. Software code optimizer 110 may use vectors 122 to form the columns or rows of matrix 124. In step 310, software code optimizer 110 retrieves a plurality of matrices 112 from database 108. Matrices 112 may be assigned to the same cluster within database 108. In step 312, software code optimizer 110 compares the matrix 124 to the plurality of matrices 112. Software code optimizer 110 may determine a distance 208 between matrix 124 and each matrix 112. In step 314, software code optimizer 110 determines the closest matrix 126 of the plurality of matrices 112. In particular embodiments, closest matrix 120 may have the shortest distance 208 between matrix 124 and itself.

In step 316, software code optimizer 110 converts the closest matrix 126 to reference software code 128. Reference code 128 may be an optimized piece of software code that performs the same functions as software code 118. In step 318, software code optimizer 110 compares the received software code 118 and the reference code 128 to determine a difference 130. In step 320, software code optimizer 110 changes the received software code 118 to resolve the difference 130 to produce optimized code 132. Software code optimizer 110 may then communicate optimized code 132 to device 104 to be implemented. In particular embodiments, by implementing optimized code 132, the resource consumption and/or execution time of software code 118 is reduced.

Figure 3B:
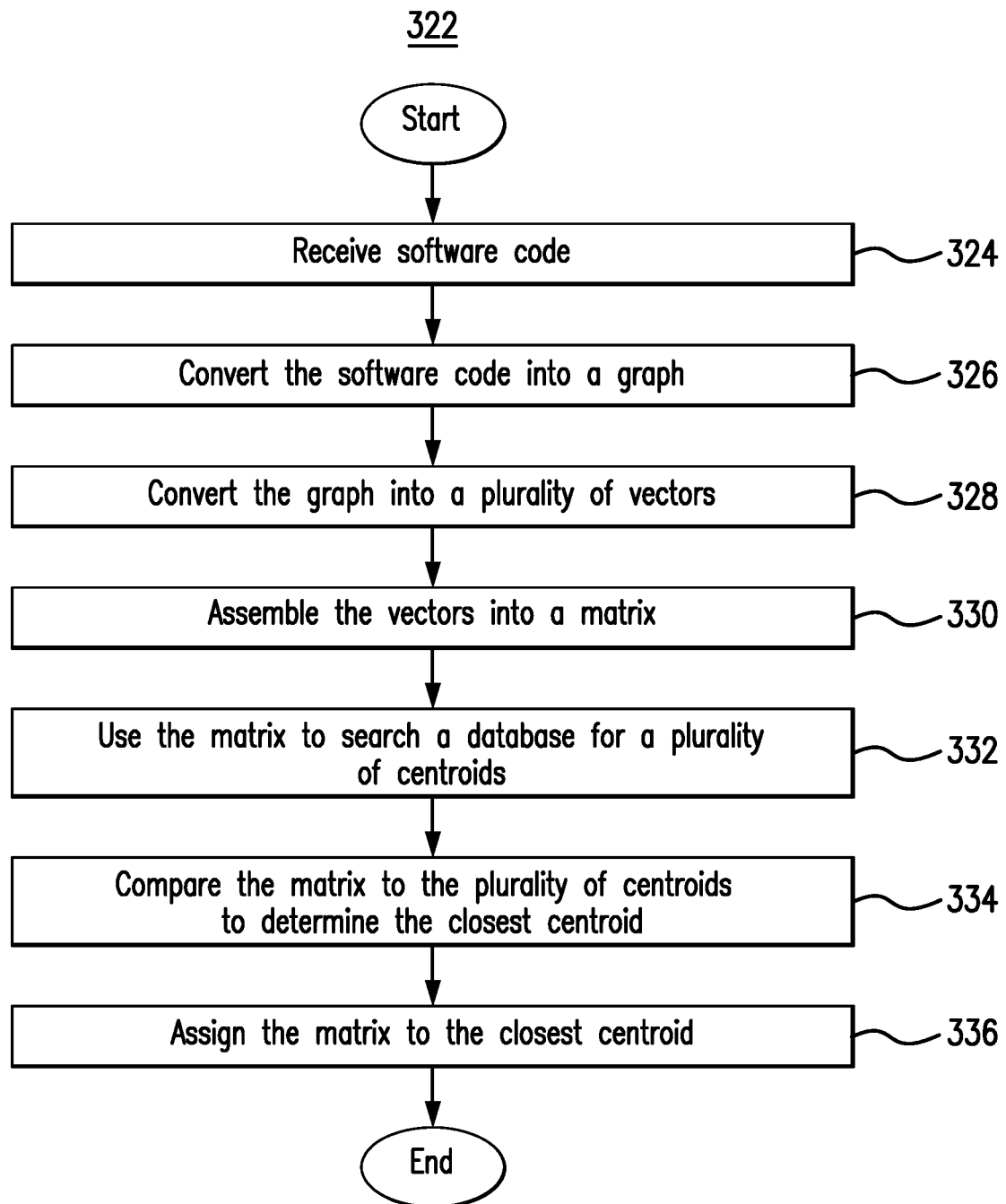

FIG. 3B is a flow chart illustrating a method 322 of optimizing software code 118 using the system 100 of FIG. 1. Generally, software code optimizer 110 performs method 322. In particular embodiments, by performing method 322 software code optimizer 110 trains itself to recognize inefficiencies within software code.

Software code optimizer 110 begins by receiving software code 118 in step 324. Software code optimizer 110 may receive software code 118 from device 104. Software code 118 may include an instruction to train software code optimizer 110 using software code 118. In step 326, software code optimizer 110 converts the software code 118 into a graph 120. In particular embodiments, software code optimizer 110 may break software code 118 into one or more portions 202 before converting software code 118 into graph 120. Graph 120 may include one or more nodes 204 and one or more links 206. Nodes 204 and links 206 may form a pictorial representation of the elements, relationships, and/or workflows in software code 118. In step 328, software code optimizer 110 converts the graph 120 into a plurality of vector 122. Each vector 122 includes a numerical representation of a workflow through software code 118. In step 330, software code optimizer 110 assembles the vectors 122 into a matrix 124. Software code optimizer 110 may use vectors 122 to form the columns or rows of matrix 124.

In step 322, software code optimizer 110 uses the matrix 124 to search a database 108 for a plurality of centroids 210. Centroids 210 may each define a cluster within database 108. In step 334, software code optimizer 110 compares the matrix 124 to the plurality of centroids 210 to determine the closest centroid 214. In particular embodiments, software code optimizer 110 may calculate a distance 212 between matrix 124 and each centroid 210. The centroid 210 with the shortest distance 212 between matrix 124 and itself is selected as the closest centroid 214. In step 336, software code optimizer 110 assigns the matrix 124 to the closets centroid 214. By assigning matrix 124 to the closest centroid 214, software code optimizer 110 effectively assigns matrix 124 to a cluster 216 defined by closest centroid 214. Software code optimizer 110 may store matrix 124 in database 108 as part of cluster 216. As a result, searching database 108 for cluster 216 in the future will return matrix 124.

Modifications, additions, or omissions may be made to methods 300 and 322 depicted in FIGS. 3A and 3B. Methods 300 and 322 may include more, fewer, or other steps. For example, steps may be performed in parallel or in any suitable order. While discussed as particular components of system 100 performing the steps, any suitable component of system 100 may perform one or more steps of the methods.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:
1. A method comprising:
receiving, by a hardware processor communicatively coupled to a memory, software code;
converting, by the hardware processor, the software code into a graph that represents a plurality of workflows through the software code, wherein:

converting the software code into the graph comprises modifying the software code to remove comments from the software code; and the graph comprises:
nodes that represent software code elements; and
links between the nodes that represent a relationship between the software elements;

converting, by the hardware processor, the graph into a plurality of vectors, each vector of the plurality of vectors comprises a numerical representation of a workflow between software code elements, wherein a similarity between the values of two vectors correlates with a level of similarity between two workflows;

assembling, by the hardware processor, the vectors into a first matrix;

using, by the hardware processor, the first matrix to search a database for a centroid, wherein the database storing a plurality of matrices;

determining, by the hardware processor and based on searching the database, a first centroid and a second centroid;

comparing, by the hardware processor, the first matrix to the first centroid and the second centroid;

determining, by the hardware processor and based on comparing the first matrix to the first centroid and the second centroid, that the first matrix is closer to the first centroid than the second centroid; and in response to determining that the first matrix is closer to the first centroid than the second centroid, assigning, by the hardware processor, the first matrix to the first centroid in the database.

2. The method of claim 1, further comprising:
retrieving, by the hardware processor, the first matrix from the database; and
converting, by the hardware processor, the first matrix into a reference code.

3. The method of claim 2, further comprising:
determining, by the hardware processor, a difference between the reference code and a second received software code; and
changing, by the hardware processor, the second received software code to resolve the difference.

4. The method of claim 3, wherein resolving the difference reduces at least one of a memory utilization and an execution time of the second received software code when the second received software code is executed.

5. The method of claim 1, further comprising removing, by the hardware processor, a comment from the received software code before converting the received software code into the graph.

6. The method of claim 1, wherein converting the received software code into the graph comprises breaking the received software code into a plurality of portions, each portion of the plurality of portions comprises a workflow of the plurality of workflows.

7. The method of claim 1, wherein determining that the first matrix is closer to the first centroid than the second centroid comprises:
determining a first distance between the first matrix and the first centroid;
determining a second distance between the first matrix and the second centroid; and
determining that the first distance is shorter than the second distance.

8. An apparatus comprising:
a memory; and
a hardware processor communicatively coupled to the memory, the hardware processor configured to:
receive software code;
convert the software code into a graph that represents a plurality of workflows through the software code, wherein:
converting the software code into the graph comprises modifying the software code to remove comments from the software code; and
the graph comprises:
nodes that represent software code elements; and
links between nodes that represent a relationship between software code elements;
convert the graph into a plurality of vectors, each vector of the plurality of vectors comprises a numerical representation of a workflow between software code elements, wherein a similarity between the values of two vectors correlates with a level of similarity between two workflows;
assemble the vectors into a first matrix;
use the first matrix to search a database for a centroid, wherein the database storing a plurality of matrices;
determine, based on searching the database, a first centroid and a second centroid;
compare the first matrix to the first centroid and the second centroid;
determine, based on comparing the first matrix to the first centroid and the second centroid, that the first matrix is closer to the first centroid than the second centroid; and
in response to determining that the first matrix is closer to the first centroid than the second centroid, assign the first matrix to the first centroid in the database.

9. The apparatus of claim 8, the hardware processor further configured to:
retrieve the first matrix from the database; and
convert the first matrix into a reference code.

10. The apparatus of claim 9, the hardware processor further configured to:
determine a difference between the reference code and a second received software code; and
change the second received software code to resolve the difference.

11. The apparatus of claim 10, wherein resolving the difference reduces at least one of a memory utilization and an execution time of the second received software code when the second received software code is executed.

12. The apparatus of claim 8, the hardware processor further configured to remove a comment from the received software code before converting the received software code into the graph.

13. The apparatus of claim 8, wherein converting the received software code into the graph comprises breaking the received software code into a plurality of portions, each portion of the plurality of portions comprises a workflow of the plurality of workflows.

14. The apparatus of claim 8, wherein determining that the first matrix is closer to the first centroid than the second centroid comprises:
determining a first distance between the first matrix and the first centroid;
determining a second distance between the first matrix and the second centroid; and
determining that the first distance is shorter than the second distance.

15. A system comprising:
a database configured to store a plurality of matrices; and a hardware device comprising a memory and a hardware processor communicatively coupled to the memory, the hardware processor configured to:
receive software code;
convert the software code into a graph that represents a plurality of workflows through the software code, wherein:
converting the software code into the graph comprises modifying the software code to remove comments from the software code; and
the graph comprises:
nodes that represent software elements; and
links between nodes that represent a relationship between software elements;
convert the graph into a plurality of vectors, each vector of the plurality of vectors comprises a numerical representation of a workflow between software code elements, wherein a similarity between the values of two vectors correlates with a level of similarity between two workflows;
assemble the vectors into a first matrix;
use the first matrix to search the database for a centroid;
determine, based on searching the database, a first centroid and a second centroid;
compare the first matrix to the first centroid and the second centroid;
determine, based on comparing the first matrix to the first centroid and the second centroid, that the first matrix is closer to the first centroid than the second centroid; and
in response to determining that the first matrix is closer to the first centroid than the second centroid, assign the first matrix to the first centroid in the database.

16. The system of claim 15, the hardware processor further configured to:
retrieve the first matrix from the database; and
convert the first matrix into a reference code.

17. The system of claim 16, the hardware processor further configured to:
determine a difference between the reference code and a second received software code; and
change the second received software code to resolve the difference.

18. The system of claim 17, wherein resolving the difference reduces at least one of a memory utilization and an execution time of the second received software code when the second received software code is executed.

19. The system of claim 15, the hardware processor further configured to remove a comment from the received software code before converting the received software code into the graph.

20. The system of claim 15, wherein converting the received software code into the graph comprises breaking the received software code into a plurality of portions, each portion of the plurality of portions comprises a workflow of the plurality of workflows.

\* \* \* \* \*